US009824582B2

(12) United States Patent
Lopez-Hinojosa et al.

(10) Patent No.: US 9,824,582 B2
(45) Date of Patent: *Nov. 21, 2017

(54) METHODS AND SYSTEMS FOR PROVIDING ALERTS TO A DRIVER OF A VEHICLE VIA CONDITION DETECTION AND WIRELESS COMMUNICATIONS

(71) Applicant: Uber Technologies, Inc., San Francisco, CA (US)

(72) Inventors: Brennan T. Lopez-Hinojosa, Albuquerque, NM (US); Kermit D. Lopez, Albuquerque, NM (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,728

(22) Filed: Jan. 2, 2017

(65) Prior Publication Data

US 2017/0169707 A1    Jun. 15, 2017

Related U.S. Application Data

(63) Continuation of application No. 14/661,065, filed on Mar. 18, 2015, now Pat. No. 9,610,893.

(51) Int. Cl.
*B60Q 1/00* (2006.01)
*G08G 1/0967* (2006.01)
*B60C 9/00* (2006.01)
*G08G 1/0962* (2006.01)
(Continued)

(52) U.S. Cl.
CPC ............. *G08G 1/0967* (2013.01); *B60C 9/00* (2013.01); *G08G 1/09623* (2013.01); *H04W 76/02* (2013.01); *H04W 4/22* (2013.01)

(58) Field of Classification Search
CPC ....... G08G 1/162; G08G 1/165; H04W 4/027; H04W 4/046; G08B 5/36
USPC ............... 340/435, 903, 439, 436, 576, 438, 340/539.13; 701/36, 538, 23, 2, 123, 701/408, 70, 1, 49; 348/118
See application file for complete search history.

(56) References Cited

U.S. PATENT DOCUMENTS

| 4,941,263 A | 7/1990 | Hirshberg |
| 5,684,455 A | 11/1997 | Williams |
| 6,014,601 A | 1/2000 | Gustafson |

(Continued)

OTHER PUBLICATIONS

AlertDriving, Global Driver Risk Management, Human Error Accounts for 90% of Road Accidents, Apr. 2011, http://www.alertdriving.com/home/fleet-alert-magazine/international/human-error-accounts-90-road-accidents, 5 pages.

(Continued)

*Primary Examiner* — Hoi Lau
(74) *Attorney, Agent, or Firm* — Mahamedi IP Law LLP

(57) ABSTRACT

Methods and system for alerting a vehicle driver via wireless communications. One or more conditions with respect to a vehicle are monitored. A change in the condition can be detected and a signal automatically and wirelessly transmitted to a computing device, wherein the signal is indicative of the change in condition(s). The driver is then alerted to the change in condition(s) in response to transmitting the signal to the computing device (e.g., a tablet computing device, smartphone, smartwatch, other wearable device, in-vehicle system, etc.) associated with the driver and/or a vehicle passenger.

20 Claims, 10 Drawing Sheets

(51) Int. Cl.
*H04W 76/02* (2009.01)
*H04W 4/22* (2009.01)

(56) References Cited

U.S. PATENT DOCUMENTS

| | | | |
|---|---|---|---|
| 6,096,969 A * | 8/2000 | Fujita | H02S 30/20 136/245 |
| 6,323,761 B1 * | 11/2001 | Son | B60R 25/10 340/426.35 |
| 6,803,956 B1 | 10/2004 | Hirono | |
| 6,985,073 B1 | 1/2006 | Doan | |
| 7,142,089 B2 * | 11/2006 | Yamagishi | B60R 25/1004 340/5.52 |
| 7,210,725 B2 | 5/2007 | Moore | |
| 7,466,227 B2 | 12/2008 | Chen et al. | |
| 7,821,422 B2 | 10/2010 | Hutchison et al. | |
| 7,860,813 B2 | 12/2010 | Wang et al. | |
| 7,957,897 B2 | 6/2011 | Basnayake | |
| 8,031,062 B2 | 10/2011 | Smith | |
| 8,139,852 B2 | 3/2012 | Shinjo et al. | |
| 8,228,210 B2 | 7/2012 | Sitbon | |
| 8,265,938 B1 | 9/2012 | Verna et al. | |
| 8,279,716 B1 | 10/2012 | Gossweiler, III et al. | |
| 8,369,838 B2 * | 2/2013 | Mallavarapu | H04M 1/72577 340/426.19 |
| 8,417,211 B2 | 4/2013 | Hong | |
| 8,429,103 B1 | 4/2013 | Aradhye et al. | |
| 8,447,139 B2 | 5/2013 | Guan et al. | |
| 8,509,824 B2 | 8/2013 | Bennett | |
| 8,718,620 B2 | 5/2014 | Rosenblatt | |
| 8,751,602 B1 | 6/2014 | Slonh | |
| 8,805,351 B2 | 8/2014 | Sigal et al. | |
| 8,811,743 B2 | 8/2014 | Kapoor et al. | |
| 8,819,172 B2 | 8/2014 | Davis et al. | |
| 8,841,987 B1 * | 9/2014 | Stanfield | G07C 9/00857 340/5.61 |
| 8,854,197 B2 | 10/2014 | Ikeda et al. | |
| 8,854,925 B1 | 10/2014 | Lee et al. | |
| 8,890,674 B2 | 11/2014 | Zeiger et al. | |
| 8,918,353 B2 | 12/2014 | Nugent | |
| 9,002,536 B2 * | 4/2015 | Hatton | B60R 25/24 340/426.13 |
| 9,043,138 B2 | 5/2015 | Ginsberg | |
| 9,047,649 B2 | 6/2015 | Haag et al. | |
| 9,092,986 B2 | 7/2015 | Salomonsson et al. | |
| 9,107,060 B2 | 8/2015 | Bull | |
| 9,305,459 B2 | 4/2016 | Rangarajan et al. | |
| 9,386,658 B2 | 7/2016 | Preta et al. | |
| 9,418,115 B2 | 8/2016 | Ganick et al. | |
| 9,483,941 B1 | 11/2016 | Childress et al. | |
| 9,487,139 B1 | 11/2016 | Ishida et al. | |
| 2002/0113875 A1 | 8/2002 | Mazzilli | |
| 2002/0120374 A1 * | 8/2002 | Douros | G09B 9/052 701/34.4 |
| 2003/0231550 A1 * | 12/2003 | Macfarlane | B60R 25/257 367/198 |
| 2005/0038573 A1 * | 2/2005 | Goudy | B60K 35/00 701/1 |
| 2005/0184860 A1 * | 8/2005 | Taruki | H04B 1/3877 340/441 |
| 2005/0231323 A1 * | 10/2005 | Underdahl | B60R 25/00 340/5.72 |
| 2006/0049922 A1 * | 3/2006 | Kolpasky | B60R 25/257 340/426.13 |
| 2006/0109095 A1 * | 5/2006 | Takata | G01S 13/931 340/436 |
| 2006/0122748 A1 * | 6/2006 | Nou | G07C 5/008 701/31.4 |
| 2006/0197761 A1 * | 9/2006 | Suzuki | G06T 5/006 345/427 |
| 2007/0096943 A1 | 5/2007 | Arnold et al. | |
| 2007/0222638 A1 | 9/2007 | Chen et al. | |
| 2008/0088479 A1 | 4/2008 | Caminiti et al. | |
| 2008/0252444 A1 * | 10/2008 | Batot | G08G 1/205 340/539.13 |
| 2008/0255722 A1 * | 10/2008 | McClellan | B60R 25/102 701/31.4 |
| 2009/0051510 A1 * | 2/2009 | Follmer | G07C 5/008 340/425.5 |
| 2009/0070031 A1 | 3/2009 | Ginsberg | |
| 2010/0079874 A1 * | 4/2010 | Kamei | G02B 13/06 359/668 |
| 2010/0094502 A1 * | 4/2010 | Ito | G08G 1/096725 701/36 |
| 2011/0034128 A1 * | 2/2011 | Kirsch | H04L 67/04 455/41.3 |
| 2011/0037618 A1 | 2/2011 | Ginsberg et al. | |
| 2011/0037619 A1 | 2/2011 | Ginsberg et al. | |
| 2011/0040621 A1 | 2/2011 | Ginsberg et al. | |
| 2011/0169626 A1 * | 7/2011 | Sun | B60Q 9/008 340/439 |
| 2011/0184895 A1 | 7/2011 | Janssen | |
| 2011/0194002 A1 * | 8/2011 | Hachisu | B60R 1/00 348/294 |
| 2011/0319910 A1 * | 12/2011 | Roelle | A61B 34/71 606/130 |
| 2012/0128210 A1 | 5/2012 | Zobel | |
| 2012/0139754 A1 | 6/2012 | Ginsberg et al. | |
| 2012/0179358 A1 | 7/2012 | Chang et al. | |
| 2012/0274481 A1 | 11/2012 | Ginsberg et al. | |
| 2012/0299749 A1 * | 11/2012 | Xiao | G08G 1/04 340/932.2 |
| 2013/0099892 A1 * | 4/2013 | Tucker | G07C 9/00309 340/5.61 |
| 2013/0271292 A1 | 10/2013 | McDermott | |
| 2014/0003710 A1 | 1/2014 | Seow et al. | |
| 2014/0047143 A1 | 2/2014 | Bateman et al. | |
| 2014/0139655 A1 * | 5/2014 | Mimar | G08B 21/0476 348/77 |
| 2014/0172753 A1 | 6/2014 | Nowozin et al. | |
| 2014/0191858 A1 * | 7/2014 | Morgan | G07C 5/0816 340/439 |
| 2014/0225724 A1 * | 8/2014 | Rankin | G06F 3/048 340/438 |
| 2014/0309864 A1 * | 10/2014 | Ricci | H04W 48/04 701/36 |
| 2014/0320637 A1 * | 10/2014 | Yi | B60R 1/00 348/118 |
| 2014/0321737 A1 | 10/2014 | Movellan et al. | |
| 2015/0154860 A1 | 6/2015 | Holzwanger et al. | |
| 2015/0251599 A1 * | 9/2015 | Koravadi | B60Q 9/008 340/903 |
| 2015/0274180 A1 * | 10/2015 | Prakah-Asante | B60W 40/09 701/36 |
| 2015/0309717 A1 * | 10/2015 | Sinaguinan | G06F 3/04847 701/538 |
| 2016/0042644 A1 * | 2/2016 | Velusamy | G08G 1/162 340/435 |
| 2016/0086285 A1 * | 3/2016 | Jordan Peters | G06Q 40/08 705/4 |
| 2016/0203717 A1 | 7/2016 | Ginsberg et al. | |
| 2016/0293006 A1 | 10/2016 | Bauer et al. | |

OTHER PUBLICATIONS

Newcomb, D., "Bluetooth in Your Car: Still Indispensable, Still Imperfect," Edmunds.com, published Aug. 27, 2013, 4 pages.
Villas-Boas, A., "Hands on With the Giroptic 360cam," PCMag. com, http//www.pcmag.com/article2/0,2817,2458401,00.asp, printed Mar. 1, 2015, 2 pages.
Optical head-mounted display—Wikipedia, the free encyclopedia, http://en.wikipedia.org/wiki/Optical_head-mounted_display, printed Mar. 17, 2015, 22 pages.
Frenzel, L. E., "Wireless PAN Alternatives to Bluetooth," Electronic Design Jun. 24, 2002, 5 pages.
'Beacon—Wikipedia, the free encyclopedia, http://en.wikipedia.org/wiki/iBeacon, printed Mar. 10, 2015, 9 pages.

(56) References Cited

OTHER PUBLICATIONS

Miersma, S., Audi Traffic Light Assists helps you hit every green light, Autoglob, http://www.autoblog.com/ces), Jan. 9, 2014, 2 pages.
Ta, V. T., Automated Road Traffic Congestion Detection and Alarm Systems: Incorporating V2I communications into ATCSs, CoRR abs/1606.01010 (2016), 31 pages.
Kim, S.J. et al., Sensors Know When to Interrupt you in the Car: Detecting Driver Interruptibility Through Monitoring of Peripheral Interactions, CHI Apr. 18-23, 2015, Seoul, Republic of Korea, 10 pages.
Brogan, J., Red Light, Green Light, Slate Aug. 25, 2015, http://www.slate.com/articles/technology/future_tense/2015/08/connected_lights_enlighten_app_lets_drivers_know_if_a_red_light_is_coming.html, 6 pages.
Badon, M., Red Light, Green Light: The Invention of the Traffic Signal, Design Observer Jun. 14, 2010, http://designobserver.com/feature/red-light-green-light-the-invention-of-the-traffic-signal/8627/, 9 pages.
Han, Y. et al., Hardware/Software Co-Design of a Traffic Sign Recognition System Using Zynq FPGAs, Electronics (2015) 4:1062-1089.
Hodgkins, K., EnLighten tells you when your traffic light is going to change, Engadget Jan. 10, 2014, https://www.engadget.com/2014/01/10/enlighten-tells-you-when-your-traffic-light-is-going-to-change/z, 9 pages.
Gonder, J. et al., Analyzing Vehicle Fuel Savings Opportunities through Intelligent Driver Feedback, SAE International Apr. 16, 2012, 13 pages.
Hsieh, C.-H. et al., Predict scooter's stopping event using smartphone as the sensing device, 2014 IEEE International Conference on Internet of Things, Green Computing and Communications, and Cyber-Physical-Social Computing, 7 pages.
Manasseh, C. G., Technologies for Mobile ITS Applications and Safer Driving, Dissertation for Doctor of Philosophy in Engineering—Civil and Environmental Engineering, University of California, Berkeley, Fall 2010, 70 pages.
Huang, Q. et al., Reliable Wireless Traffic Signal Protocols for Smart Intersections, At the Crossroads: Integrating Mobility and Safety and Security. ITS America 2004, 14th Annual Meeting and Exposition, San Antonio, Texas, 17 pages.
Siogkas, G. et al., Traffic Lights Detection in Adverse Conditions Using Color, Symmetry and Spatiotemporal Information, VISAPP (2012), pp. 620-627.

\* cited by examiner

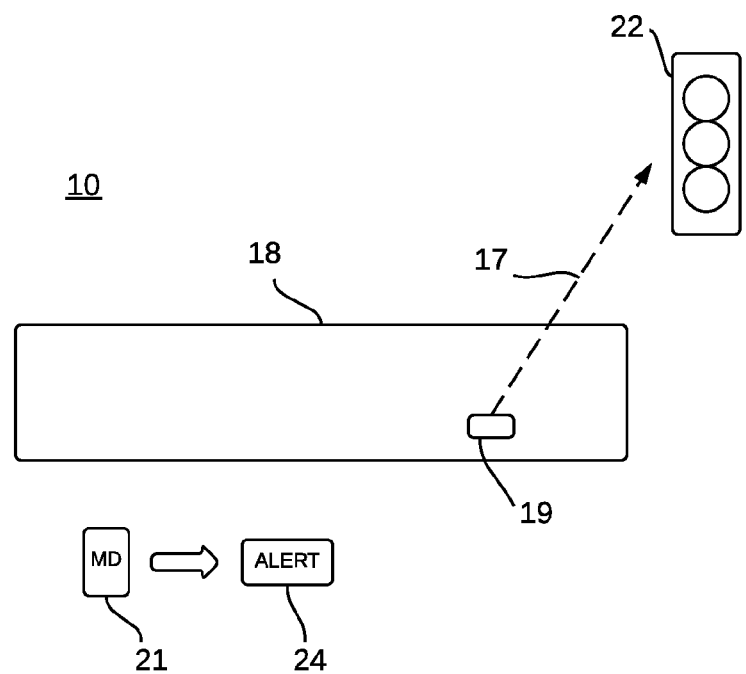
FIG. 1
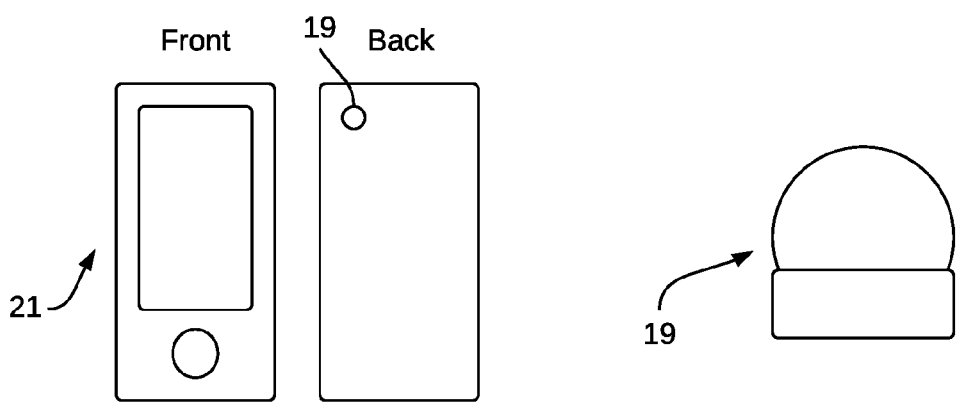
FIG. 2(a)   FIG. 2(b)

METHODS AND SYSTEMS FOR PROVIDING ALERTS TO A DRIVER OF A VEHICLE VIA CONDITION DETECTION AND WIRELESS COMMUNICATIONS

CROSS-REFERENCE TO PATENT APPLICATION

This application is a continuation of U.S. patent application Ser. No. 14/661,065 entitled "Methods and Systems for Providing Alerts to a Driver of a Vehicle Via Condition Detection and Wireless Communications," which was filed on Mar. 18, 2015, the disclosure of which is incorporated herein by reference in its entirety.

TECHNICAL FIELD

Embodiments are generally related to the field of electronic mobile wireless devices (e.g., smartphones, smartwatches, tablet computing devices, laptop computers, etc.). Embodiments also relate to connected car technology and the deployment of electronic mobile wireless devices in the context of automotive vehicles. Embodiments are additionally related to the detection of external and internal conditions with respect to a vehicle and the notification of alerts to a user regarding such conditions.

BACKGROUND OF THE INVENTION

The availability of on-board electronics and in-vehicle information systems has accelerated the development of more intelligent vehicles. One possibility is to automatically monitor a driver's driving performance to prevent potential risks. Although protocols to measure a driver's workload have been developed by both government agencies and the automobile industry, they have been criticized as being too costly and difficult to obtain. In addition, existing uniform heuristics for driving risk preventions do not account for changes in individual driving environments. Hence, technologies for understanding a driver's frustrations to prevent potential driving risks has been listed by many international automobile companies as one of the key research areas for realizing intelligent transportation systems.

Additionally, there is a need to monitor not only a driver's activity (e.g. driver inattention) but also to monitor the driver's activity with respect to certain conditions, which may be external to the vehicle or may occur within the vehicle. For example, a driver may be approaching a red light or the driver may be stopped at a red light and is looking at his cell phone or other distractions instead of being attentive to the traffic light.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for alerting a driver of a vehicle of a change in condition external to or within the vehicle.

It is another aspect of the disclosed embodiments to provide a method and system for issuing alerts to a vehicle driver and/or passenger via wireless communications.

The aforementioned aspects and other objectives and advantages can now be achieved as described herein. Methods and system are disclosed for alerting a vehicle driver via wireless communications. Such an approach can include steps or operations for monitoring one or more conditions with respect to a vehicle, detecting a change in the condition (or conditions), automatically transmitting a signal wirelessly to a computing device, wherein the signal is indicative of the change in condition(s), and alerting the driver of the change in condition(s) in response to transmitting the signal to the computing device (e.g., a tablet computing device, smartphone, smartwatch, etc.).

In some embodiments, the step or operation of alerting the driver to the change in condition(s) can further include a step or operation of providing an audible alert via a speaker associated with the computing device, wherein the audible alert indicative of the change condition(s). In another embodiment, the step or operation of alerting the driver of the change in condition(s) can further include steps or operations for establishing a wireless connection between the computing device and a radio system of the vehicle. And providing an audible alert from or via the computing device indicative of the change in condition via the radio system. In another embodiment, the step or operation of alerting the driver of the change condition(s) can further include or involve a step or operation for alerting the driver of the change in the condition by a text message displayable through the computing device.

In another embodiment, the step or operation of monitoring the condition(s) with respect to the vehicle can further involve monitoring of the condition with one or more cameras (e.g., a video camera, high-definition video camera, etc.). In some embodiments, one or more of such cameras can be a 360 degree video camera. In other embodiments, monitoring the condition(s) with respect to the vehicle may also involve monitoring condition(s) with one or more sensors, either by themselves or in association with the aforementioned video camera(s). In another embodiment, the step or operation of monitoring the condition(s) with respect to the vehicle can involve a step or operation of analyzing video data from the video camera(s) (e.g., an HD video camera, a 360 degree video camera etc.) utilizing anomaly detection (e.g., an anomaly detection module, anomaly detection mechanism, etc.). In yet another embodiment, the step or operation of monitoring the condition(s) can further involve a step or operation for analyzing video data captured by the video camera(s) utilizing machine learning. In still another embodiment, the step or operation of monitoring the condition(s) with respect to the vehicle can further involve or include a step or operation for analyzing video data obtained from the video camera(s) utilizing location data (e.g., GPS data, beacon data) from a location module (e.g., GPS module, beacon module, etc.) associated with the computing device. The location data can be employed to cross-reference location identification information, for example, with respect to items or objects identified from the video data obtained from the video camera(s).

In another embodiment, a method can be implemented for alerting a vehicle driver via wireless communications, wherein such a method includes steps or operations for monitoring condition(s) external to a vehicle while the vehicle is in operation and a driver of the vehicle is located in a driver seat of the vehicle, detecting a change in the condition(s); transmitting a signal wirelessly to a computing device, wherein the signal indicative of a change in the condition(s); and alerting the driver regarding the change in condition(s), after transmission of the signal to the computing device.

In some embodiments, the step of alerting the driver of the change in the condition(s) after transmission of the signal to the computing device, can further involve a step or operation of providing or issuing an audible alert via a speaker associated with the computing device, wherein the audible alert is indicative of the change in condition(s).

In another embodiment, the step or operation of alerting the driver of the change in condition(s) after transmission of the signal to the computing device, can further include steps or operations for establishing a wireless connection between the computing device and a radio system of the vehicle; and issuing or providing an audible alert from the computing device which is issued (e.g., played or broadcast) through the vehicle's radio system, wherein the audible alert is indicative of the change in condition. In such a situation the radio system is in communication with the computing device. The computing device may be a separate wireless mobile electronic device such as a smartphone, smartwatch or tablet computing device associated with the driver and/or a passenger (or passengers) in the vehicle, or the computing device may be a computing system integrated with the vehicle and which communicates electronically with the radio system. In some embodiments, the "vehicle in operation" may involve the vehicle in motion or the vehicle temporarily stopped (e.g., at an intersection, dropping or picking up a passenger, etc.). In another embodiment, the step or operation of alerting the driver of the change in condition(s), after transmission of the signal to the computing device, can further involve a step or operation of providing an audible alert via a speaker associated with the computing device, the audible alert indicative of the change in condition(s).

In yet another embodiment, the step or operation of alerting the driver of the change in the condition(s) after transmission of the signal to the computing device, can further involve steps or logical operations for establishing a wireless connection between the computing device and a radio system of the vehicle; and providing an audible alert from the computing device indicative of the change in the condition(s) via the radio system. In still another embodiment, the step or operation of monitoring a condition external to the vehicle while the vehicle is in operation and the driver of the vehicle is located in the driver seat of the vehicle, can further include a step or operation o monitoring the condition(s) with a camera (e.g., video camera, HD camera, 360 degree video camera, etc.) that communicates with the computing device. In some embodiments, the video camera may be integrated with the computing device (e.g., a tablet computing device video camera, smartphone video camera, etc.), while in other embodiments, the camera may be a standalone camera positioned within the vehicle to monitor the condition(s) and which communicates via a wireless connection with the computing device (e.g., tablet computing device, smartphone, smartwatch, integrated in-vehicle computing system, etc.).

In still another embodiment, a step or operation can be provided for tracking and recording in a memory of a computing system (e.g., a server, an in-vehicle computing system, a tablet computing device, a smartphone, a smartwatch, laptop computer, desktop computer, etc.), data indicative of the number of times the driver is alerted to changes in conditions. In another embodiment, steps or operations can be implemented for periodically retrieving such tracked and recorded data from the memory, and transmitting the data wirelessly from the computing system to a central repository (e.g., a server) for further storage and analysis. Note that in some embodiments, the condition(s) external to the vehicle may be a stop light condition (e.g., traffic light) and the change in the condition(s) involves a change from one stop light color to another stop light color (e.g. red to green, green to red, green to yellow, etc.).

In another embodiment the step or operation of transmitting the signal wirelessly to the computing device, wherein the signal is indicative of the change in condition(s), can further involve a step or operation for transmitting the signal wirelessly through a PAN (Personal Area Network). In some embodiments, the PAN may be a network enabled for Bluetooth wireless communications, induction wireless communications, infrared wireless communications, ultra-wideband wireless communications and/or ZigBee wireless communications. In some embodiments, the wireless connection between the computing device and the radio system can be established via Secure Simple Pairing (SSP).

In another embodiment, the step or operation of detecting the change in the condition(s) can involve utilizing anomaly detection or machine learning approaches for detecting the change in the condition(s).

In yet another embodiment, steps or operations can be provided for determining if the vehicle is no longer in operation, monitoring the condition(s) within the vehicle, in response to determining that the vehicle is no longer in operation, determining if the condition(s) within the vehicle comprises an anomalous condition; and wirelessly transmitting an alert to a computing device associated with the user, the alert indicative of the anomalous condition, if is determined that the condition(s) comprises the anomalous condition (i.e., if it is determined that the condition or conditions are anomalous). Note that in some embodiments, the alert can be wirelessly transmitted as a text message to the computing device via a wireless network, wherein the text message is displayed via a display screen associated with the computing device.

In another embodiment, a system for alerting a vehicle driver via wireless communications, can be implemented. Such a system can include, for example, a video camera (i.e., one or more video cameras), one or more processors which communicate with and process video data captured by the video camera, and a computer-usable medium embodying computer program code, wherein the computer-usable medium capable of communicating with the processor(s). The computer program code can include instructions executable by the processor(s) and configured, for example, for: monitoring condition(s) with respect to the vehicle with the video camera, detecting a change in the condition(s) monitored via the video camera, transmitting a signal wirelessly to a computing device, the signal indicative of the change in condition(s), and alerting the driver of the change in condition(s) in response to transmitting the signal to the computing device. As indicated previously, the computing device may be, for example, mobile electronic device such as a smartphone, tablet computing device, laptop computer and so on. In some embodiments, the computing device may be an in-vehicle computing system that communicates wirelessly with other computing devices such as the driver's and/or a passenger's smartphone, tablet computing device, etc.

In some embodiments, the instructions for alerting the driver of the change condition(S) can be further configured for providing an audible alert via a speaker associated with the computing device, wherein the audible alert is indicative of the change condition(s). In yet another embodiment, the instructions for alerting the driver of the change in the condition(s) can be further configured for establishing a wireless connection between the computing device and a radio system of the vehicle; and providing an audible alert from the computing device indicative of the change in the condition(s) via the radio system. In another embodiment, the instructions for alerting the driver of the change in the condition(s) can be further configured for alerting the driver of the change in the condition(s) by a text message displayable through the computing device and/or played or broadcast as a voice alert through the computing device. As indicated previously, the camera(s) may be, for example, a video camera, HD video camera, 360 degree video camera, and so on. In some embodiments, one or more sensors (e.g., temperature sensor, pressure sensor, velocity sensor, acceleration sensor, vehicle heading sensor, etc.) may be employed for use in monitoring the conditions external to or within the vehicle.

In some embodiments, the instructions for monitoring the condition(s) can be further configured for analyzing the video data captured from the video camera utilizing anomaly detection or machine learning techniques. In still other embodiments, the instructions for monitoring the condition(s) can be configured for analyzing the video data captured from the 360 degree video camera utilizing, for example, location data from a location or locating module (e.g., beacon module, GPS module, etc.) associated with the computing device and in association with the captured video data.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a schematic diagram of driver alerting system, in accordance with a preferred embodiment;

FIG. 2(a) illustrates an example computing device constituting a smartphone or tablet computing device, which may be adapted for use in accordance with one embodiment;

FIG. 2(b) illustrates an example camera, which may be located in a vehicle for monitoring conditions external to the vehicle, in accordance with another embodiment;

DETAILED DESCRIPTION

Figure 3:
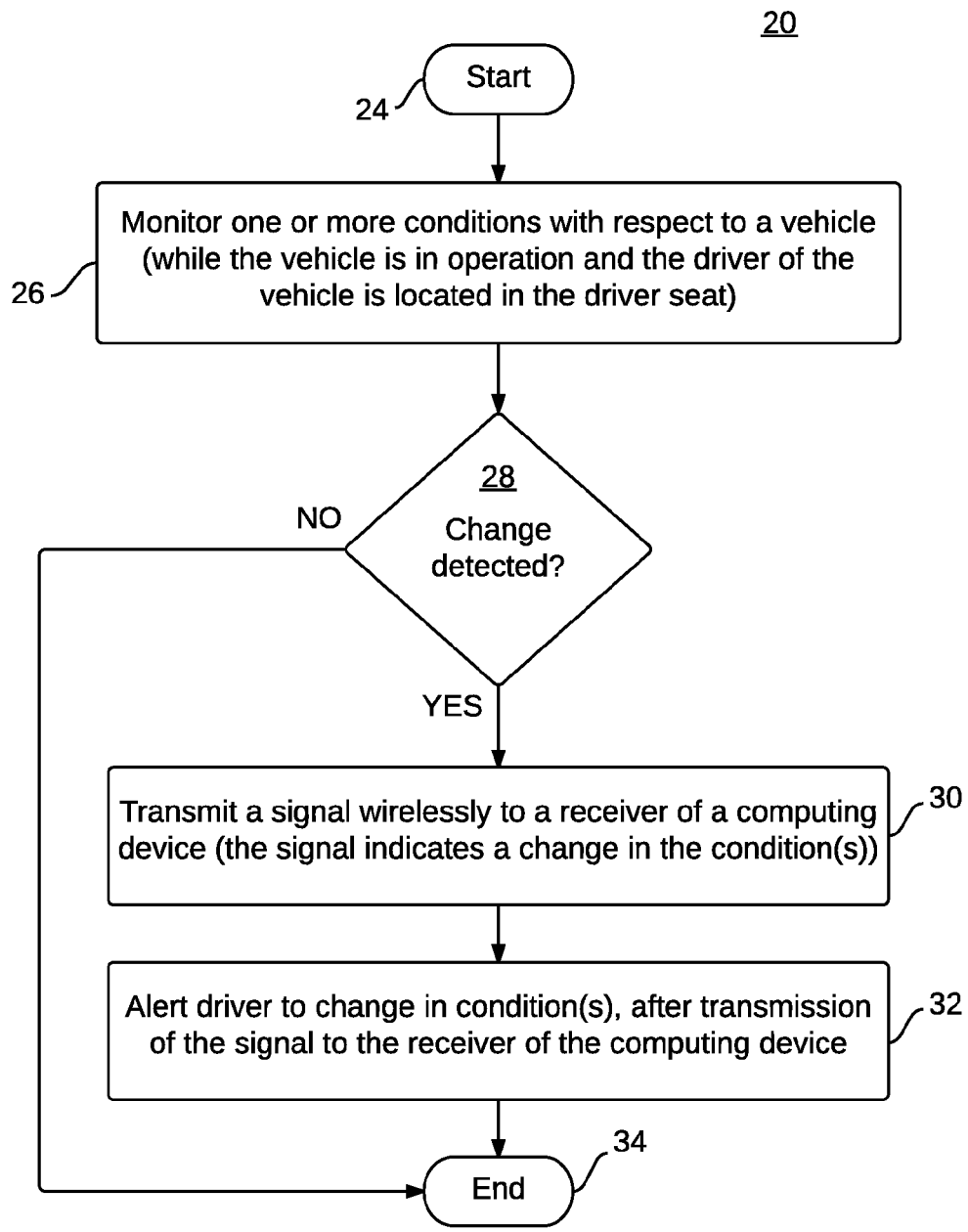
FIG. 3 illustrates a method for alerting a vehicle driver via wireless communications, in accordance with an embodiment.

The particular values and configurations discussed in these non-limiting examples can be varied and are cited merely to illustrate one or more embodiments and are not intended to limit the scope thereof.

FIG. 1 illustrates a schematic diagram of a system 10 for alerting a vehicle driver via wireless communications, in accordance with a preferred embodiment. System 10 monitors one or more conditions with respect to a vehicle, preferably (but not necessarily) while the vehicle is in operation and the driver of the vehicle is located in the vehicle's driver's seat. The conditions may be external to the vehicle or internal depending upon the application or need. In the example shown in FIG. 1, the change in condition is depicted a change in the color of a traffic light 22. A camera 19 (e.g., a video camera) is shown in FIG. 1 as located on a dashboard with respect to a front vehicle windshield 18. For example, the traffic light 22 may change from red to green and an alert 24 is issued alerting the driver of the change in color when a change in the condition (i.e., change in color, in this case) is detected. The monitoring activity (e.g., monitoring the traffic light 22) is indicated in FIG. 1 by dashed arrow 17. As will be discussed in greater detail herein, such monitoring activity can be facilitated by a the camera 19 and other components and modules.

The alert 24 may be transmitted wirelessly to, for example, the user's mobile electronic wireless computing device 21 (e.g., a smartphone, tablet computing device, smartwatch, wearable device, etc.) or to a device or system integrated with the vehicle. Note that electronic devices such as smartphones, smartwatches, personal digital assistants (PDAs) mobile telephones, tablet devices, laptops and other Internet connectivity devices ("mobile stations") provide users with mobile access to various information resources. Such mobile stations generally operate via a cellular 3G or 4G broadband data communication standard and/or a WIFI network connection to a local area network. In FIG. 1 the computing device is shown as MD (Mobile Device) 21.

In the example of FIG. 1, the monitoring activity (e.g., monitoring the traffic light or other conditions) can be facilitated by one or more cameras such as, for example, a camera 19 which may be located on the dashboard of the vehicle with a view through the vehicle windshield 18. In such a situation, the camera 19 may be, for example, a dashcam. A dashboard is a preferable location for camera 19, but it should be appreciated that the camera 19 may be located in other positions within the vehicle. In the example depicted in FIG. 1, only a single camera 19 is shown. In other embodiments, as will be explained in greater detail herein, more than one camera may be implemented in the context of a vehicle. In the FIG. 1 scenario, camera 19 is shown monitoring the external condition (e.g., traffic light 22 changing color) through the windshield 18.

FIG. 2(a) illustrates an example computing device 21, which is shown as a smartphone implementation. It can be appreciated, however, that the computing device 21 can be implemented as other types of wireless mobile devices, such as a tablet computing device, and wearable devices such as a smartwatch.

A non-limiting example of a wearable device such as a smartwatch, which can be utilized as computing device 21 is depicted in U.S. Pat. No. 8,854,925 entitled "Smart Watch and Control Method for the Same," which issued on Oct. 7, 2014 and is incorporated herein by reference. Another non-limiting example of a smartwatch that can be adapted for use as computing device 21 is disclosed in U.S. Pat. No. 8,279,716 entitled "Smart-Watch Including Flip-Up Display," which issued on Oct. 2, 2012 and is incorporated herein by reference. Note that the terms "smart watch" and "smartwatch" and "smart-watch) can be utilized interchangeably to refer to the same type of device.

Another example of a wearable device that can be implemented as computing device 21 is an OHMD (Optical Head-Mounted Display) that can be equipped with a video camera. OHMD is a wearable display that has the capability of reflecting projected images as well as allowing the user to see through it that is augmented reality.

The computing device 21 can incorporate a video camera 19. In some embodiments, the example computing device 21 with camera 19 may be implemented in the context of, for example, a smartphone or tablet computing device located or mounted on the vehicle dashboard or elsewhere within the vehicle (or located on the vehicle external to the passenger compartment). The alert 24 may be broadcast as an audio alert or text alert message through the computing device 21. In some embodiments, the alert can be transmitted in the context of a voice alert, which is discussed further herein.

In another embodiment, the camera 19 may be implemented as a standalone camera that communicates wirelessly with the computing device 21 via wireless communications as described in greater detail herein. FIG. 2(*b*) illustrates an example camera 19, which may be located in an optimal location with the vehicle for monitoring conditions external to the vehicle, in accordance with another embodiment. In the FIG. 2(*b*) implementation, the camera 19 may communicate wirelessly with the computing device 21. One non-limiting example of a video camera which may adapted for use as, for example, camera 19 shown in FIG. 2(*b*) is disclosed in U.S. Patent Application Publication No. 20140047143 entitled "Wireless video camera and connection methods including a USB emulation," which issued on Feb. 13, 2014 and is incorporated herein by reference in its entirety.

Camera 19 may also be implemented as, for example, a so-called dashcam or dash cam. A dashcam (dashboard camera) is an onboard camera that attaches to the vehicle's interior windscreen by either a supplied suction cup mount or an adhesive-tape mount. It can also be positioned on top of the dashboard or attached to the rear-view mirror with a special mount. It continuously records the road ahead while the vehicle is in motion. Various types of dashcam can be implemented as camera 19, ranging from basic video cameras to those capable of recording parameters such as date/time, speed, G-forces and location. In some embodiments, camera 19 may be implemented as a wearable video camera that monitors conditions external to the vehicle or within the vehicle. Such a video camera may be, for example, a lapel camera worn by a the vehicle driver and/or a passenger.

FIG. 3 illustrates a method 20 for alerting a vehicle driver via wireless communications, in accordance with an embodiment. As indicated at block 24, the process begins.

Thereafter, as shown at block 26, a step or logical operation can be implemented for monitoring one or more conditions external to the vehicle and optionally while the vehicle is in operation and the driver of the vehicle is located in a driver seat of the vehicle.

Note that such a monitoring step or logical operation may involve monitoring the condition with a camera that communicates with the computing device. The camera may be integrated the computing device (e.g., a Smartphone or tablet computer). In other embodiments, such a camera may be a standalone camera positioned within the vehicle to monitor the condition and the camera may also communicate via a wireless connection (e.g., Bluetooth or other wireless communication as discussed in greater detail herein) with the computing device.

Monitoring can involve the use of object recognition or other video image recognition techniques and systems. For example, in one embodiment a traffic recognition approach can be utilized as part of the video monitoring operation. One example of a traffic object recognition approach that can be adapted for use in accordance with an embodiment is disclosed in U.S. Patent Application Publication No. 2011/0184895 entitled "Traffic Object Recognition System, Method for Recognizing a Traffic Object, and Method for Setting up a Traffic Object Recognition System," which published to Janssen on Jul. 28, 2011 and is incorporated herein by reference in its entirety. Another object recognition approach that can be adapted for use in accordance with an alternative embodiment is disclosed in U.S. Pat. No. 8,447,139 entitled "Object recognition using Haar features and histograms of oriented gradients," which issued on May 21, 2013 and is incorporate herein by reference in its entirety.

Next, as illustrated at decision block 28, a test can be performed to determine if a change has been detected the monitored conditions (or conditions). If a change is detected, then as disclosed at block 30, a step or logical operation can be implemented for transmitting a signal wirelessly to a computing device, wherein such a signal indicative of the change in the condition(s) monitored. Thereafter, as shown at block 32, a step or logical operation can be implemented to alert the driver of the change in the condition after transmission of the signal to the computing device.

It can be appreciated that the vehicle in operation may be, for example, temporarily stopped (e.g., at an intersection/stop light, a parking lot, in traffic, etc.) or in motion. In some implementations, the computing device that receives and plays the alert (e.g., an audio signal or voice announcement) may be, for example, a smartphone or a tablet computing device. In other embodiments, the computing device may be integrated with the vehicle as part of an in-vehicle system that provides alerts and other information (e.g., GPS information) to the vehicle's occupants. Such a system typically includes a dashboard display. One example of a non-limiting in-vehicle system that can be adapted for use in accordance with an alternative embodiment is disclosed in US Patent Application Publication No. 20110034128 entitled "Mobile Communication Device Linked to In-Vehicle System," which published on Feb. 10, 2011 and is incorporated herein by reference in its entirety. Yet another example of a non-limiting in-vehicle system that can be adapted for use in accordance with an alternative embodiment is disclosed in U.S. Pat. No. 8,417,211 entitled "In-Vehicle System (IVS) Control of Emergency Data Communications," which issued on Apr. 9, 2013 and is incorporated herein by reference in its entirety.

It can also be appreciated that in the context of a tablet or smartphone implementation, the computing device may not necessarily belong to the vehicle driver but may, for example, be a computing device (e.g., hand held wireless electronic device, smartphone, tablet, etc.) belonging to passengers.

Figure 4:
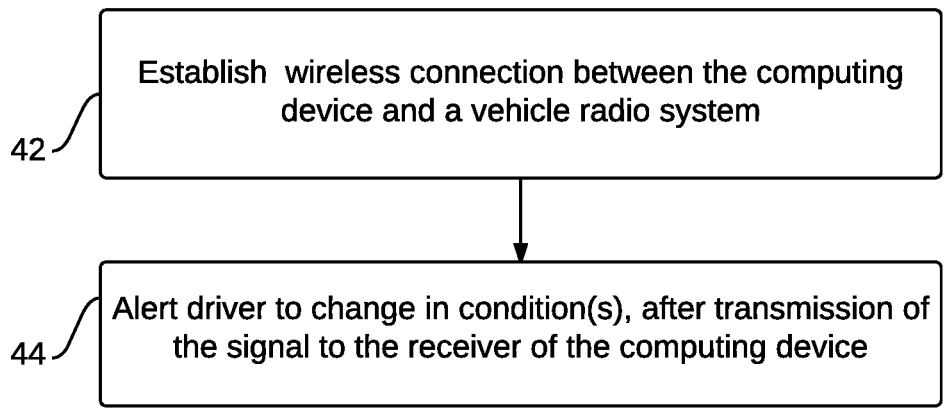
FIG. 4 illustrates a method for alerting a vehicle driver, in accordance with an alternative embodiment.

FIG. 4 illustrates a method 40 for alerting a vehicle driver, in accordance with an alternative embodiment. In some embodiments, the step or logical operation of alerting the driver of the change in condition after transmission of the signal to computing device, can further involve providing an audible alert via a speaker associated with the computing device, wherein the audible alert indicative of the change in the monitored condition. Such an alerting operation may involve establishing a wireless connection between the computing device and a radio system of the vehicle as shown at block 42, and providing the audible alert from the computing device via the radio system, as indicated at block 44.

Figure 5:
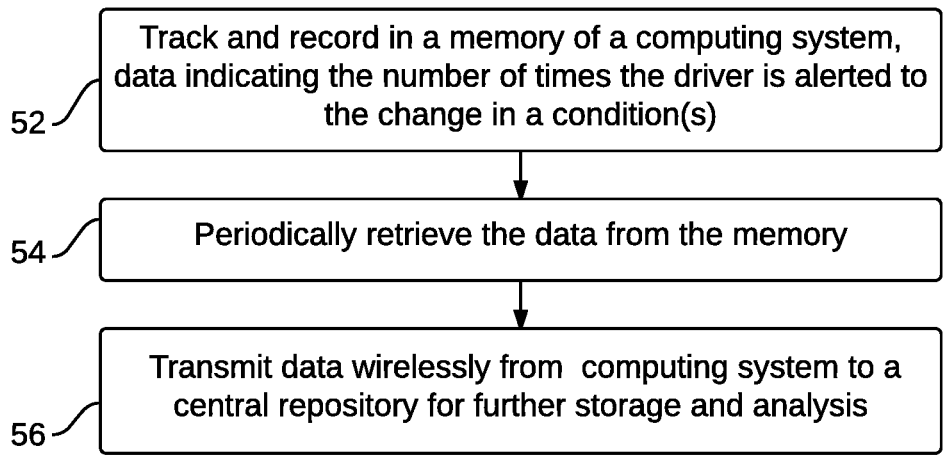
FIG. 5 illustrates a method 50 for tracking driver activity, in accordance with an alternative embodiment.

FIG. 5 illustrates a method 50 for tracking driver activity, in accordance with an alternative embodiment. It can be appreciated that in some embodiments, the disclosed monitoring method/system can be modified to monitor not just external conditions or activities, but the activity of the driver itself in order to track, for example, driver inattentiveness. As depicted at block 52, a step or logical operation can be implemented for tracking and recording in a memory of a computing system data indicative of the number of times the driver is alerted to a change a condition. Then, as shown at block 54, a step or logical operation can be implemented to periodically retrieve such data from the memory, and as shown at block 56, transmit such data wirelessly from the computing system to a central repository for further storage and analysis. Such data may be useful, for example, for insurance companies.

Figure 6:
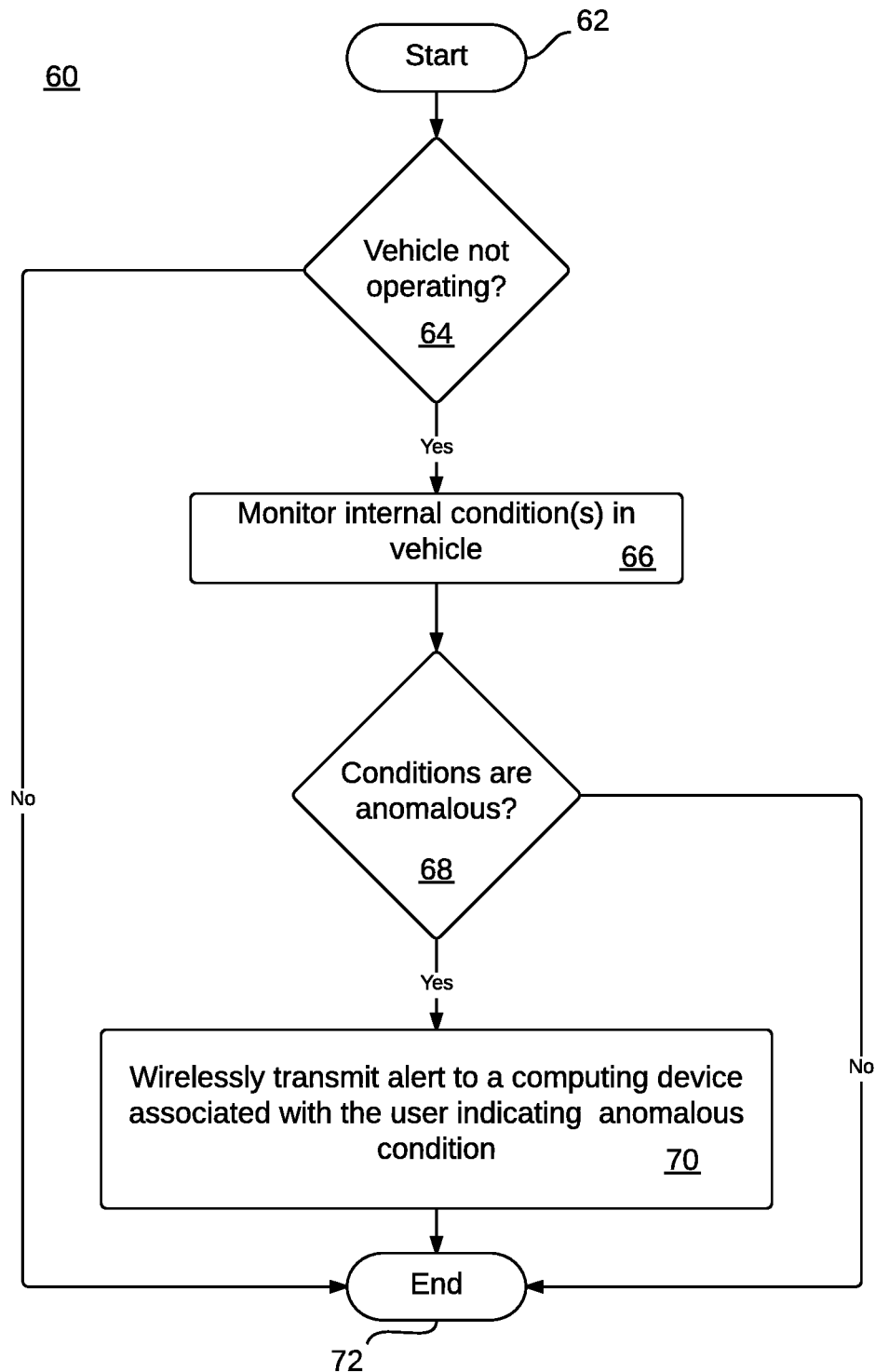
FIG. 6 illustrates a method 60 for monitoring conditions with respect to a vehicle, in accordance with an alternative embodiment.

FIG. 6 illustrates a method 60 for monitoring conditions with respect to a vehicle, in accordance with an alternative embodiment. As indicated at block 62, the process is initiated. Thereafter, as depicted at decision block 64, a test can be performed to determine if the vehicle is in operation. If it is determined that the vehicle is in operation, then the process ends, as shown at block 72. If it is determined that the vehicle is no longer in operation (e.g., the key is removed from the ignition), then as indicated at block 66, conditions within the vehicle are monitored. For example, a camera and/or sensors may monitor conditions within the vehicle (or external to the vehicle).

As depicted at block 68, a test is performed to determine if conditions anomalous. Anomalous conditions may include one of a variety of possible conditions. For example, an anomalous condition may be a change in temperature in the vehicle. Another anomalous condition may be, for example, the presence of someone in the vehicle who normally would not still be in the vehicle after the car is turned off or, for example, the vehicle doors are closed and/or locked. If such an anomalous condition is detected, then as indicated at block 70, an alert may be wirelessly transmitted to a computing device associated with a user (e.g., the vehicle driver, a passenger, etc.) indicating such an anomalous condition. The process can then terminate, as depicted at block 72. Note that in some embodiments, such an alert may be wirelessly transmitted as a text message to the computing device via a wireless network. Such a wireless network can be, for example, a cellular telephone network and/or a WiFi network.

A text message alert can be implemented via for example, Short Message Service (SMS), SkyMail, Short Mail, Instant Messaging (IM), chat, Mobile Instant Messaging (MiM), Multimedia Messaging Service (MMS), and other messaging services. Text messaging is supported by computer devices such as laptop computers, desktop computers, handheld computers, and wireless devices such as cellular telephones, Wireless Local Area Network (WLAN) terminals, Wireless Wide Area Network (WWAN) terminals, and Wireless Personal Area Network (WPAN) terminals, for example.

Typically, a text message server serves as an intermediate device for receiving a text message from a source device, storing the text message, and forwarding the text message to a recipient device, e.g., a first cell phone as a source device and a second cell phone as a recipient device. While some text message service providers charge for text message support, e.g., cellular networks, other text message service providers support text messaging without charge. Various protocols such as SS7, GSM MAP, or TCP/IP, for example, may be employed to support text messaging.

In some embodiments, the alert regarding a change in condition can be implemented in the context of a notification service. In one example, the text message may be sent as a push notification across a cellular or wireless communication network to the computing device. Certain text messaging protocols may be used, such as, mobile short message service (SMS), multimedia message service (MMS), and instant messaging (IM), or any other related text application. The communication medium may include transferring information over communication links, such as wireless networks (e.g., GSM, CDMA, 3G, 4G, etc.), wireline networks (e.g., landline telephony), Internet, satellite/cable networks, or, any other data medium using standard communication protocols.

An example of a notification service that can be adapted for use with an alternative embodiment is disclosed in U.S. Pat. No. 8,751,602 entitled "Method and Apparatus of Providing Notification Services to Smartphone Devices," which issued on Jun. 10, 2014 and is incorporated herein by reference in its entirety. Another non-limiting example of a system that can be adapted for use in accordance with an alternative embodiment for delivery of an alert regarding a change in condition is disclosed in U.S. Pat. No. 8,265,938 entitled "Voice Alert Methods, Systems and Processor-Readable Media," which issued on Sep. 11, 2012 and is incorporated herein by reference in its entirety.

An example of a situation where the method 60 would be useful is the case of a child accidentally being left in a vehicle during hot weather. A camera in the vehicle operating via battery power or residual electricity from the vehicle electrical system may detect an anomaly such as the child in a rear car seat. The anomaly in this case would be the presence (e.g., detection of the child moving, turning his or her head, moving his or her arms, legs, etc.) of a child in a car seat, wherein a child would not normally be in the car seat after the car is no longer in operation and/or after the doors are closed/locked, and/or after a particular amount of time (e.g., 5 minutes, 10 minutes, etc.). Note that a cellular network or cellular link or service such as OnStar can be utilized for sending out an alert (e.g., text message, audio alert) etc. to let them know that a child may have been left in a car seat.

Audio sensors may also be employed to detect, for example, the sound of a crying child. A temperature sensor could also be utilized to detect a rise in temperature to an unsafe level for humans and when that temperature threshold is met, the alert is transmitted wirelessly to the user's hand held device (e.g., smartphone, tablet, smartwatch or other wearable device, etc.). Such an approach could thus be utilized to prevent tragic and unnecessary deaths in automobiles due to heatstroke.

Note that the step or logical operation of anomaly detection or outlier detection shown in block 68 can involve the identification of items, events or observations which may not conform to an expected pattern or other items in a dataset. Anomalies are also referred to as outliers, novelties, noise, deviations and exceptions. In the context of abuse and network intrusion detection, "interesting" objects are often not rare objects, but unexpected bursts in activity. This pattern does not adhere to the common statistical definition of an outlier as a rare object, and many outlier detection methods (in particular unsupervised methods) will fail on such data, unless it has been aggregated appropriately. Instead, a cluster analysis algorithm may be able to detect the micro dusters formed by these patterns.

The anomaly detection operation shown at block 68 can preferably be implemented by an anomaly detection mechanism based on a number of possible categories of anomaly detection including but not limited to, unsupervised anomaly detection, supervised anomaly detection, semi-supervised anomaly detection, etc. An unsupervised anomaly detection technique can be employed detect anomalies in an unlabeled test data set under the assumption that the majority of the instances in the data set are normal by looking for instances that seem to fit least to the remainder of the data set. Alternatively, a supervised anomaly detection technique may be employed, which requires a data set that has been labeled as "normal" and "abnormal" and involves training a classifier (the key difference to many other statistical classification problems is the inherent unbalanced nature of outlier detection). Semi-supervised anomaly detection techniques may also be employed, which construct a model representing normal behavior from a given normal training data set, and then testing the likelihood of a test instance to be generated by the learnt model.

Figure 7:
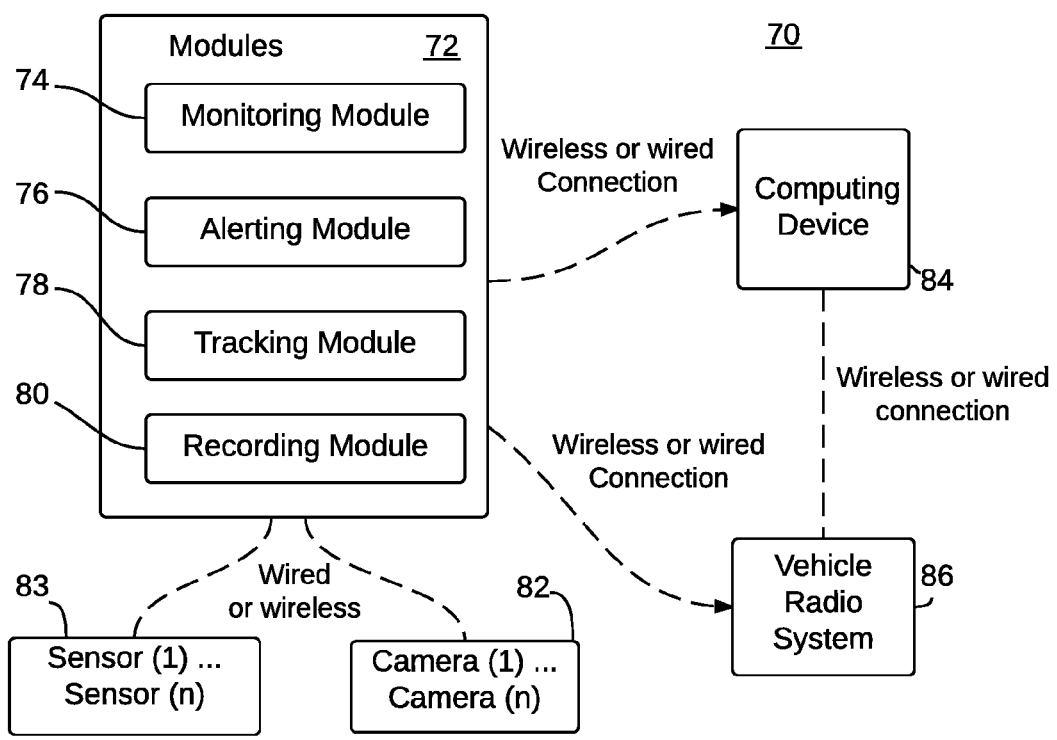
FIG. 7 illustrates a schematic diagram of a system for alerting a vehicle driver via wireless communications, in accordance with an alternative embodiment.

FIG. 7 illustrates a schematic diagram of a system 70 for alerting a vehicle driver via wireless communications, in accordance with an alternative embodiment. System 70 includes a module (or group of modules) 72 including a monitoring module 74, an alerting module 76, a tracking module 78, and a recording module 80. Module 72 can communicate wirelessly with a computing device 84 (e.g., a driver/passenger smartphone, tablet computer, etc.), which in turn can communicate wirelessly with the vehicle radio system 86. One or more sensor(s) 83 can communicate with module 72 and one or more camera(s) 82 may communicate with the module 72. The sensor(s) 83 and the camera(s) 82 can communicate with module 72 via wireless or wired communications. Note that the camera (or cameras) 82 are similar or analogous to the camera 19 discusses previously herein. The computing device 84 is also in some embodiments similar or analogous to the electronic wireless device 21 discusses previously herein.

Examples of sensors that can be utilized to implement sensor(s) 83 are sensors such as temperature sensors, pressure sensors, velocity sensors, acceleration sensors, vehicle heading sensors, yaw-rate sensors, and so on. One example of a vehicle heading sensor approach that can be adapted for use as or with sensor(s) 83 in accordance with an alternative embodiment, is disclosed in U.S. Pat. No. 7,957,897 entitled "GPS-based in-vehicle sensor calibration algorithm," which issued on Jun. 7, 2011 and is incorporated herein by reference in its entirety. The GPS module discussed herein can be utilized in association with such sensors to provide location or position data with respect to the vehicle and also provide vehicle heading sensor data.

Note that in some embodiments, the computing device 84 can communicate with the vehicle radio system via wireless communications established via Secure Simple Pairing (SSP). The sensor(s) 83 and the camera(s) 82 and the computing device 84 may also in some embodiments communicate with module 72 via SSP. SSP, which requires less user interaction utilizes a one-time six-digit key displays at the time of pairing on both the device and the car, replacing the PIN code. Once the user confirms that the keys match, the two devices can be paired.

The monitoring module 74 can implement the monitoring steps or operations discussed previously. For example, monitoring module 74 can monitor traffic lights or other conditions (i.e., conditions external to the vehicle or within the vehicle) facilitated by, for example, camera(s) 82 and/or sensor(s) 83. The monitoring module 74 can be, for example, an anomaly detection mechanism that detects changes in conditions as discussed previously.

The alerting module 76 serves to alert the driver of the detected change in a condition. The alert (e.g., an audio alert, a text message, etc.) can be broadcast through, for example, the computing device 84 or the vehicle radio system 86 (assuming the vehicle radio system 86 is paired with the computing device 84). The tracking module 78 and the recording module 80 function to respectively track and record in a memory of a computing system (e.g., the computing device 84, an onboard computing system, etc.) data indicative of, for example, the number of times the driver is alerted to changes in conditions. Such data can be retrieved from the computer memory and then transmitted to, for example, a central repository for further storage and analysis.

It can be appreciated that in some cases, the connections between the various components shown in FIG. 7 may be implemented via wireless communications and/or wired connections. For example, the module 72 can be stored and retrieved from a computer memory which may be, for example, a memory of computing device 84, a memory of an integrated in-vehicle computing system, and/or a remote computing device or system such as a remote server. Wireless communications can occur through a wireless network such as an in-car PAN (Personal Area Network) including Bluetooth communications, or other communications means such as, for example, a cellular network.

Figure 8:
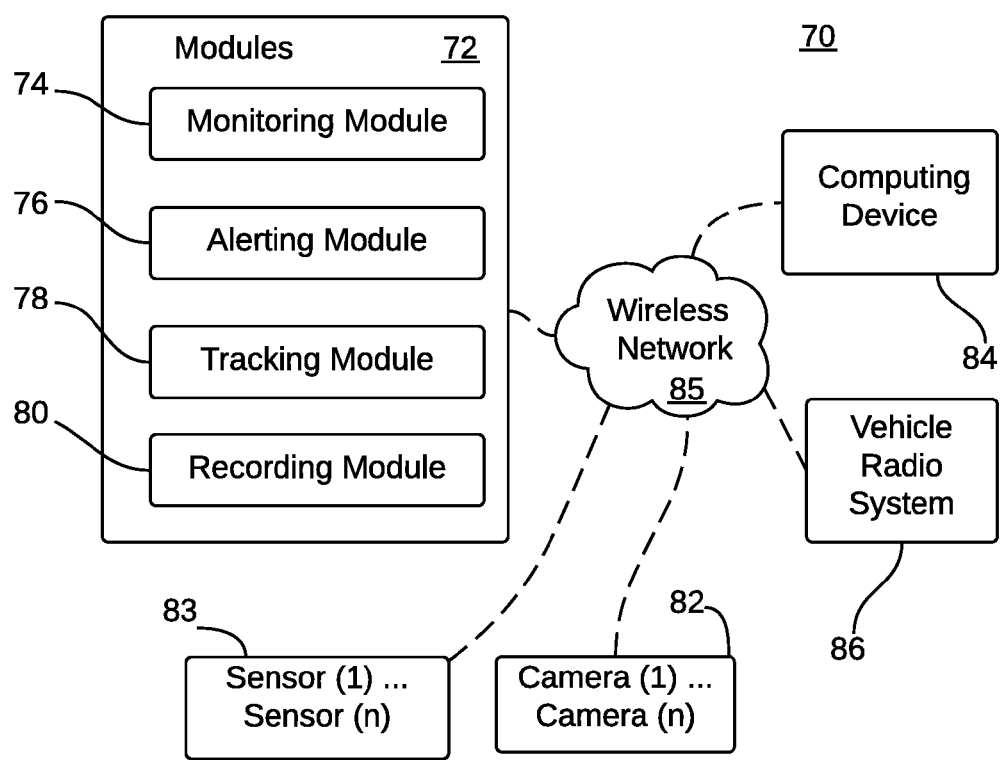
FIG. 8 illustrates a schematic diagram of a system for alerting a vehicle driver via wireless communications, in accordance with an alternative embodiment.

FIG. 8 illustrates a schematic diagram of a system 70 for alerting a vehicle driver via wireless communications, in accordance with an alternative embodiment. System 70 shown in FIG. 8 is an alternative version of system 70 depicted in FIG. 7. The embodiment shown in FIG. 8 includes similar or identical components to the FIG. 7 embodiment with some slight variations. For example, FIG. depicts a wireless network through which the various components can communicate. In one embodiment, for example, the wireless network 85 may implement an in vehicle Bluetooth wireless communications system. The signal containing data indicative of the alert can be wirelessly transmitted to the computing device 84 (assuming the computing device 84 in this case is, for example, a Bluetooth enabled smartphone or tablet computing device). In some embodiments, the computing device 84 (assuming a Bluetooth enabled device) may be associated with one or more Bluetooth automotive speakers wherein the signal is processed via the computing device 84 as an audio signal that can be played through the Bluetooth automotive speaker.

The wireless network 85 may be implemented as a PAN (Bluetooth or otherwise), and the signal transmitted through the PAN. It should be appreciated that wireless network 85 may be implemented not just via Bluetooth communications, but through one of a number of possible alternative PAN wireless technologies. For example, in one embodiment wireless network 85 may be implemented as a PAN based on induction wireless technology, which uses magnetic induction rather than radio for close-range communications. In radio, both electric and magnetic fields make up the signal, while in induction wireless, only the magnetic field is transmitted. The transmitter in this context is a radiating coil that is more like the primary winding of a transformer than an antenna. A PAN based on an induction wireless approach has about a 3-m range. A typical unit transmits up to 204.8-kbit/s data rates via GMSK modulation on 11.5 MHz. Key benefits of induction wireless technologies are extremely low power consumption, low cost, and the inherent security that accompanies short range.

Another implementation of wireless network 85 can involve the use of infrared wireless communications. Such a PAN technology can be employed for use over short distances. The IrDA infrared (IR) standard appeared during the early 1990s, and can be utilized to implement wireless network 85 as a PAN network. IrDA initially offered a 115.2-kbit/s data rate over a range of up to 1 m. A 4-Mbit/s version was soon developed and has been widely incorporated in laptops and PDAs for printer connections and short-range PANs. A 16-Mbit/s version is available too The problem with IrDA is not just its very short range, but also its need for a line-of-sight (LOS) connection. Of course, Bluetooth does not need LOS, and it can blast through walls. A more recent IR development is IrGate, which was produced by Infra-Com Technologies. This new IR development uses arrays of high-powered IR LEDs to emit coded baseband IR in all directions. Then, it relies on an array of photodetectors and super-sensitive receivers to pick up the diffused IR within the networking space. Thus, the LOS problem is mitigated, and a data rate of up to 10 Mbits/s is possible.

Still another wireless technology for implementing wireless network 85 in the context of, for example, an in-vehicle PAN is UWB (Ultra Wideband), which transmits data by way of baseband pulses applied directly to the antenna. The narrow pulses (less than 1 ns) create an extremely broad bandwidth signal. The pulses are modulated by pulse position modulation (PPM) or binary phase-shift keying (BPSK). The FCC permits UWB in the 3.1- to 10.6-GHz band. Its primary application to date has been short-range, high-resolution radar and imaging systems that penetrate walls, the ground, and the body. In addition, this new technology is useful for short-range LANs or PANs that require very high data rates (over 100 Mbits/s).

Still another wireless technology for implementing wireless network 85 in the context of, for example, an in-vehicle PAN is ZigBee, which is a simpler, slower lower-power, lower-cost cousin of Bluetooth, ZigBee. ZigBee is supported by a mix of companies that are targeting the consumer and industrial markets. It may be a better fit with games, consumer electronic equipment, and home-automation applications than Bluetooth. Short-range industrial telemetry and remote control are other target applications. It can be appreciated, however, that wireless network 85 can be implemented as a ZigBeen PAN.

Previously referred to as RF-Lite, ZigBee is similar to Bluetooth because it uses the 2.4-GHz band with frequency-hopping spread-spectrum with 25 hops spaced every 4 MHz. The basic data rate is 250 kbits/s, but a slower 28-kbit rate is useful for extended range and greater reliability. With a 20-dBm power level, ZigBee can achieve a range of up to 134 meters at 28 kbits/s. It additionally allows for networking of up to 254 nodes.

Note that in some embodiments, whether that of FIG. 7 or FIG. 8 or other implementations, camera(s) 82 may be implemented as a 360 degree camera which can be employed for use in monitoring not only conditions within the vehicle but external to vehicle. In a preferred embodiment, camera (s) 82 and/or camera 19 discussed earlier can be implemented as an HD (High Definition) 360 degree camera that provides quality video data that can be monitored via, for example, anomaly detection, machine learning and other techniques.

An example of a 360 degree camera that can be adapted for use with one or more embodiments is the Giroptic 360cam by Gripoptic. Such a device includes three 185-degree fish-eye cameras, allowing it to capture 360 degrees of HD video and photos (including time-lapse and HDR). The Giroptic 360cam captures audio as well as video, and can record 3D sound from three microphones. Media can be saved onto a microSD card, which is then loaded onto a computer via a micro USB port on the unit's base, or via Wi-Fi. It can be appreciated that such a device (or other 360 degree video cameras) can be modified to communicate via other types of wireless communications, such as Bluetooth communications, cellular, and so forth as discussed herein. Note that reference herein to the Giroptic video camera is for illustrative purposes only and is not considered a limiting feature of the disclosed embodiments.

Figure 9:
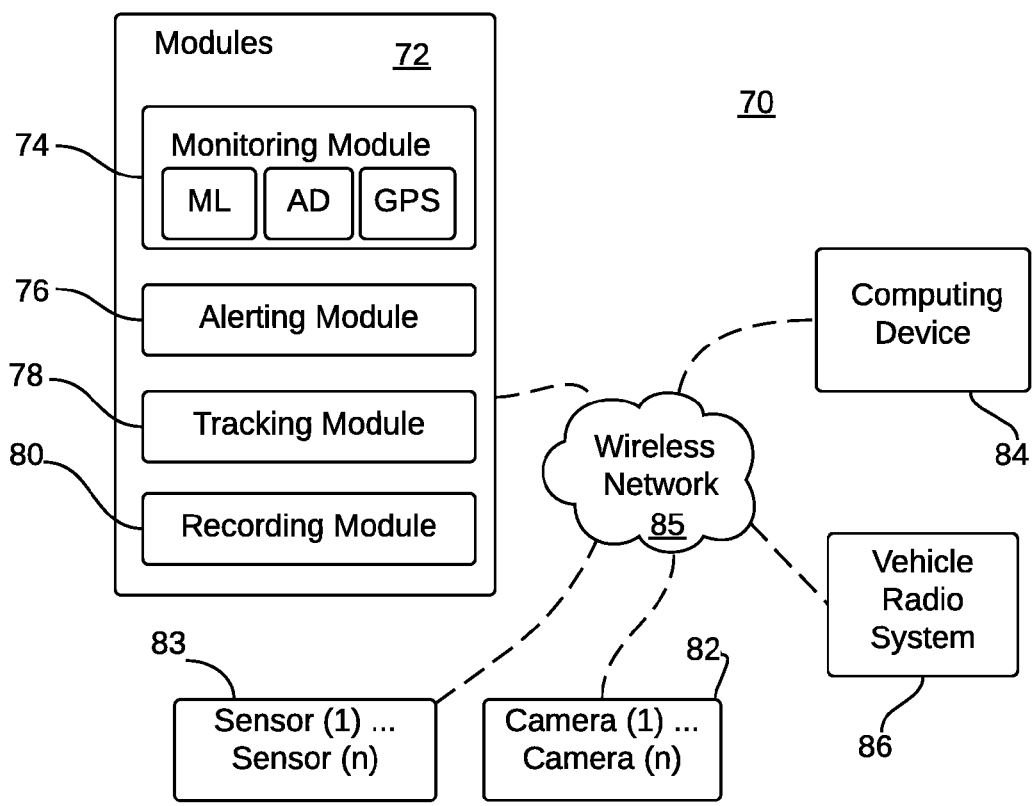
FIG. 9 illustrates a schematic diagram of a system for alerting a vehicle driver via wireless communications, in accordance with an alternative embodiment.

FIG. 9 illustrates a schematic diagram of a system 70 for alerting a vehicle driver via wireless communications, in accordance with an alternative embodiment. In the alternative embodiment of system 70 shown in FIG. 7, the monitoring module 72 can utilize an AD (Anomaly Detection) mechanism or module as discussed previously and/or ML (Machine Learning) and/or GPS (Global Positioning Satellite) modules.

ML techniques can be employed in the context of, for example, an algorithm that operates by building a model from example inputs and used to make predictions or decisions, rather than following strictly static program instructions. ML can be used to construct a model or rule set to predict a result based on values with respect to a number of features. A series of input patterns can be provided to an algorithm along with a desired output (e.g., the label) and the algorithm then learns how to classify the patterns by outing a desired label. In supervised learning (e.g., Kemal-based support vector machine (SVM) algorithm), a human operator must provide the labels during a teaching phase. Alternatively, unsupervised clustering is a process of assigning labels to the input patterns without the use of the human operator. Such unsupervised methods generally function through a statistical analysis of the input data by determining an Eigen value vector of a covariance matrix.

One non-limiting ML technique that can be adapted for use in accordance with an embodiment is AHaH (Anti-Hebbian and Hebbian) learning, which can be employed for feature extraction. One example of an AHaH ML approach is disclosed in U.S. Pat. No. 8,918,353 entitled "Methods and Systems for Feature Extraction," which issued on Dec. 23, 2014 and is incorporated herein by reference in its entirety. Another non-limiting ML technique that can be adapted in accordance with another embodiment is disclosed in U.S. Pat. No. 8,429,103 entitled "Native Machine Learning Service for User Adaptation on a Mobile Platform,"

which issued on Apr. 23, 2013 and is incorporated herein by reference in its entirety. It can be appreciated that such ML approaches are referred to for illustrative purposes only and are not considered limiting features of the disclosed embodiments.

In the context of the embodiment shown in FIG. 9, ML can be combined with the AD mechanism to recognize patterns in, for example, video data captured by video camera (s) 19, 82, etc. to detect changes in conditions external to the vehicle or within the vehicle. Location data may also be employed to determine the location of the vehicle with respect to conditions being monitored external or within the vehicle. Location data may include, for example, GPS data and/or other location data, such as, beacon data (e.g., "iBeacon" data, etc.). Note that FIG. 9 illustrates the use of a GPS module and GPS data (i.e., see "GPS" in FIG. 9). It can be appreciated that other types of location data may also be employed such as beacon data (e.g., see FIG. 13).

For example, in some embodiments the monitoring operation of monitoring module 74 can involve estimating the distance to a particular point or location near the vehicle and providing a notification/alert via the alerting module 75 in the form of an audio alert, text message etc. ML and/or AD modules or mechanisms can be employed to detect changes in conditions with respect to particular geographic locations. For example, the GPS data may be utilized to determine that the vehicle is rapidly approaching particular crosswalk or intersection and an alert issued to let the driver know that he or she is approaching this particular crosswalk or intersection, while the ML and/or AD modules or techniques can be employed to determine if someone is in the middle of the crosswalk/intersection.

Possible alerts or conditions to be monitored and alerted can be, for example, "approaching a red light," "changing lanes," "approaching a median," "15 feet to a median," "10 feet to a median," "at median," etc. The camera(s) 19, 82 and so forth and the monitoring module 75 can look for conditions such as medians, red lights, yellow lights etc. and determines how far away these things are from the vehicle.

Figure 10:
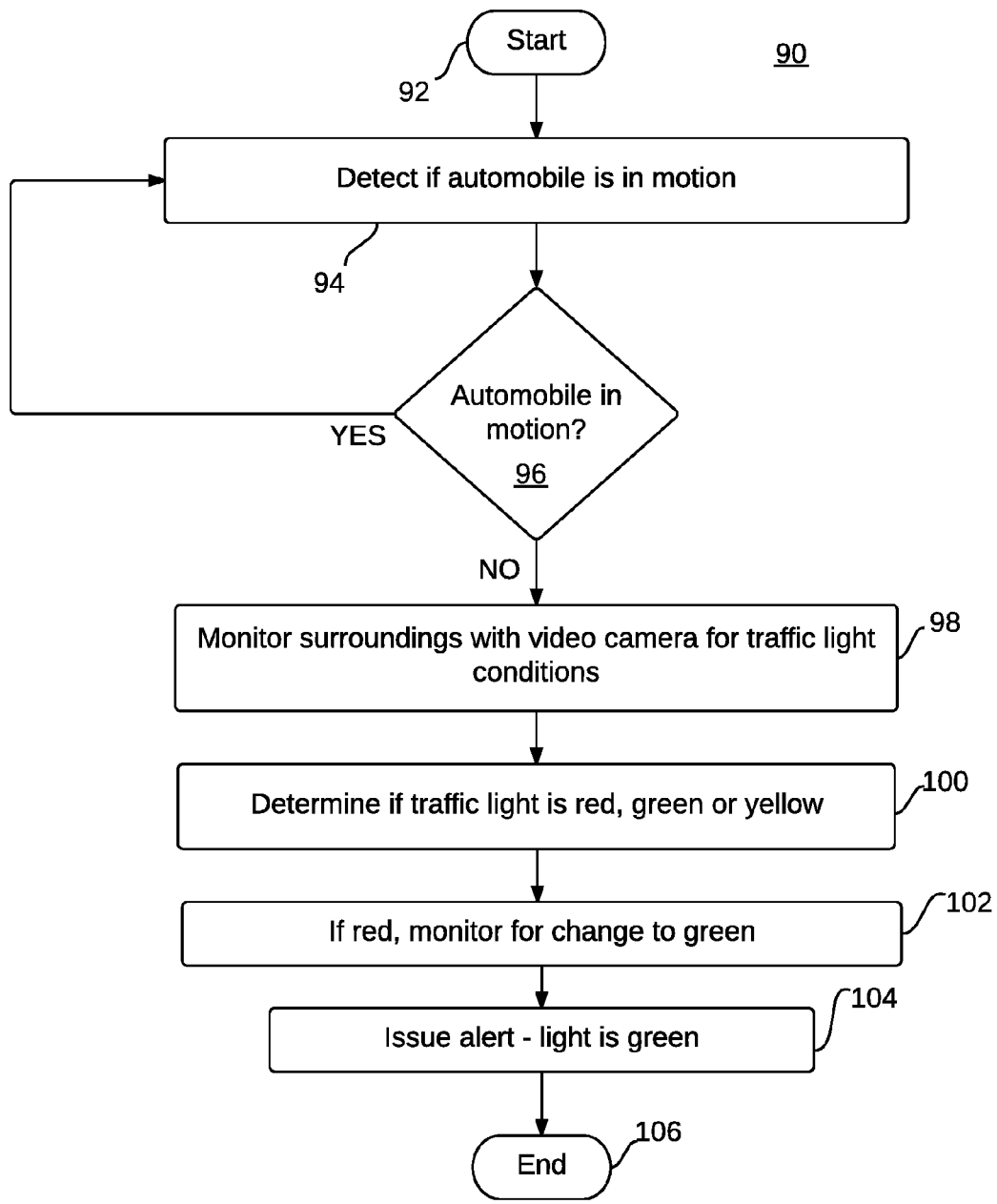
FIG. 10 illustrates a method for alerting a vehicle driver of a change in traffic light conditions via wireless communications, in accordance with an embodiment.

FIG. 10 illustrates a high level flow chart of operations depicting logical operational steps of a method 90 for alerting a vehicle driver of a change in traffic light conditions via wireless communications, in accordance with an alternative embodiment. As indicated at block 92, the process can be initiated. Thereafter, as disclosed at block 94, a step or logical operation can be implemented for detecting if the driver's vehicle/automobile is in motion. Thereafter, as shown at decision block 96, a test can be performed to determine if the automobile is in motion. If so, then the monitoring process continues, as shown at block 94. If not, then as indicated at block 98, a video camera (e.g., cameras 19, 21, etc.) can monitor the vehicle's surroundings for traffic light conditions. For example, a step or operation can be implemented to search for and identify a traffic light and its conditions (e.g., red, green or yellow lights).

Note that a non-limiting example of a camera that can be adapted for use in accordance with the operation shown as block 98 and in some implementations for us as the camera 19 discussed earlier herein is a color recognition camera. A non-limiting example of a color recognition camera is disclosed in U.S. Pat. No. 6,803,956 entitled "Color Recognition Camera," which issued on Oct. 12, 2004 and is incorporated herein by reference in its entirety. Such an example color recognition camera includes a red-green-blue CCD-imaging device that provides an analog RGB-video signal. A set of three analog-to-digital converters converts the analog RGB-video signal into a digital RGB-video signal. A digital comparator tests the digital RGB-video signal pixel-by-pixel for a match against a color setpoint. If a match occurs, a pixel with a particular color represented by the color setpoint has been recognized and a "hit" is output. A pixel address counter provides a pixel address output each time a "hit" is registered. The number of hits per video frame are accumulated, and a color-match area magnitude value is output for each frame. Alternatively, neural networks can be used to indicate hits when a pixel in the video image comes close enough to the color setpoint value. Just how close can be "learned" by the neural network.

As indicated next at block 100, a step or logical operation can be implemented to determine if the light is red, green or yellow. If it is determined, as shown at block 102, that the light is red, then the traffic light is monitored to determine if there is change from to green. Assuming that the light changes from red to green, an alert (e.g., audio) is then issued indicating the change from red to green, as depicted at block 104. The process can then terminate, as shown at block 106.

Note that another color recognition approach that can be adapted for use in accordance with an alternative embodiment and for monitoring a change in color (e.g., traffic light change from yellow to green, red to green, etc.) is disclosed in U.S. Pat. No. 8,139,852 entitled "Color classification method, color recognition method, color classification apparatus, color recognition apparatus, color recognition system, computer program, and recording medium," which issued on Mar. 12, 2012 and is incorporated herein by reference in its entirety.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 11:
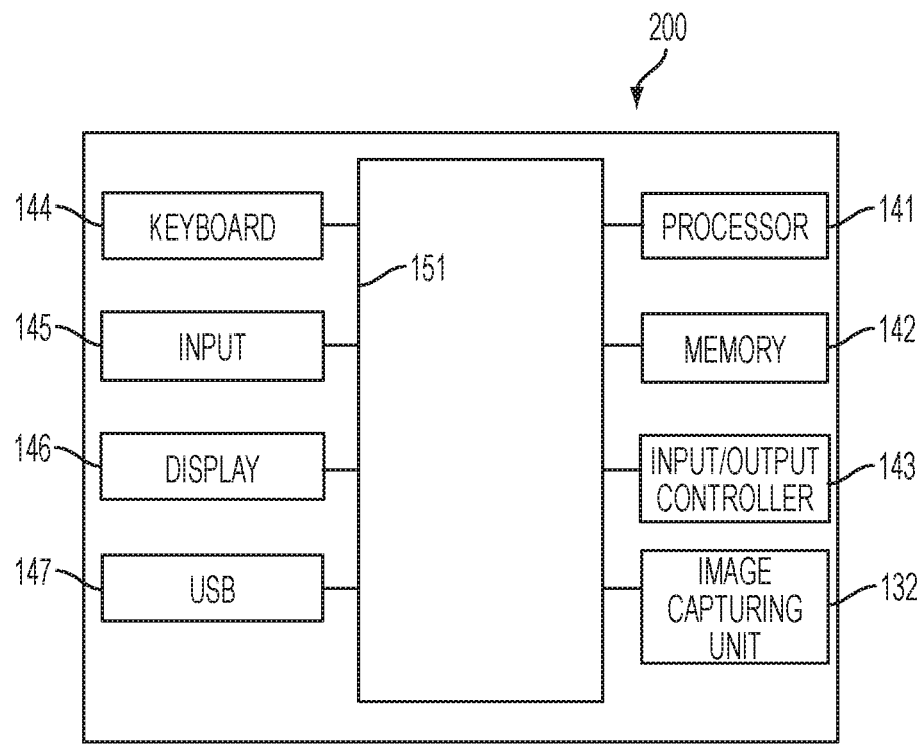
FIG. 11 illustrates a schematic view of a computer system, in accordance with an embodiment.
Figure 12:
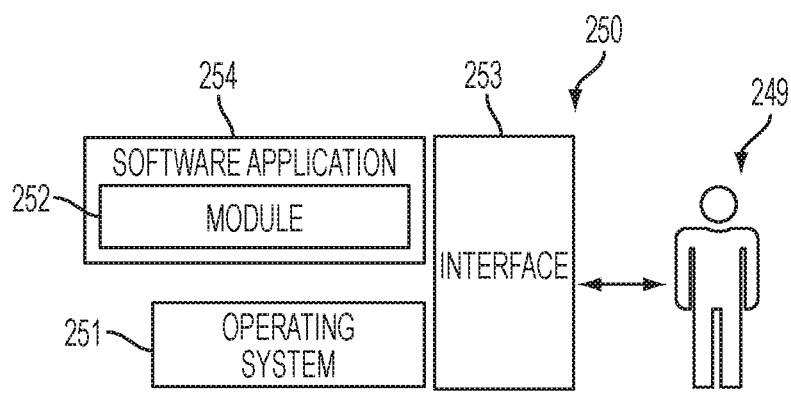
FIG. 12 illustrates a schematic view of a software system including a module(s), an operating system, and a user interface, in accordance with an embodiment.

FIGS. 11-12 are shown only as exemplary diagrams of data-processing environments in which embodiments may be implemented. It should be appreciated that FIGS. 11-12 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 11, some embodiments may be implemented in the context of a data-processing system 200 that can include, for example, one or more processors such as processor 141, a memory 142, a controller 143, a peripheral USB (Universal Serial Bus) connection 147, a display 146, an input device (e.g., a mouse, touch screen display, etc.), a keyboard, etc. Data-processing system 200 may be, for example, a client computing device (e.g., a client PC, laptop, tablet computing device, smartphone, etc.) which can communicate with, for example, a server (not shown) and/or other devices (e.g., wireless and/or wired communications).

As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may also be, for example, a stand-alone desktop computer, a laptop computer, a Smartphone, a pad computing device and so on. In the case of a smartphone, it can be assumed that devices such as keyboard 144, input unit 145 and so on would implemented in the context of a touch screen display or other appropriate mobile input interface. The data-processing system 200 can also include or communicate with an image capturing unit 132 (e.g., a video camera such as discussed herein, etc.).

FIG. 12 illustrates a computer software system 250 for directing the operation of the data-processing system 200. Software application 254, stored for example in memory 202, generally includes a kernel or operating system 251 and a shell or interface 253. One or more application programs, such as software application 254, may be "loaded" (i.e., transferred from, for example, mass storage 207 or other memory location into the memory 201) for execution by the data-processing system 200. The data-processing system 200 can receive user commands and data through the interface 253; these inputs may then be acted upon by the data-processing system 200 in accordance with instructions from operating system 251 and/or software application 254.

The interface 253 in some embodiments can serve to display results, whereupon a user 249 may supply additional inputs or terminate a session. The software application 254 can include one or more modules such as module 252, which can, for example, implement instructions or operations such as those described herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 11-12 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 13:
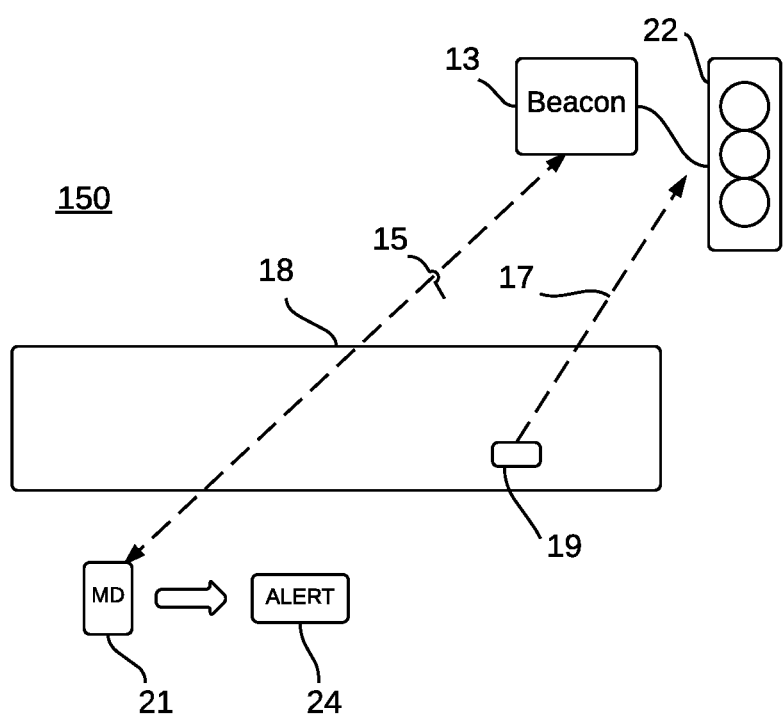
FIG. 13 illustrates a schematic diagram of driver alerting system, in accordance with an alternative embodiment.

FIG. 13 illustrates a schematic diagram of driver alerting system 150, in accordance with an alternative embodiment. Note that the system 150 shown in FIG. 13 is similar to, for example, system 10 shown in FIG. 1. In the FIG. 13 implementation, however, a beacon 13 is shown as associated with traffic light 22 and can be accessible by nearby mobile electronic devices such as mobile device 21. The beacon 13 is implemented as part of a positioning system. One example of beacon 13 is the "iBeacon" device and associated system. The iBeacon is a trademark of Apple Inc. for a positioning system that Apple Inc. has referred to as a new class of low-powered, low-cost transmitters that can notify nearby iOS devices of their presence. The technology enables a smartphone or other device to perform actions when in close proximity to an iBeacon or in this case beacon 13.

Thus, beacon 13 can assist the mobile computing device 21 in determining its approximate location or context. With the assistance of beacon 13, software associated with mobile computing device 21 can approximately find its relative location with respect to beacon 13 and hence with respect to the traffic light 22 (assuming the beacon 13 is located at or proximate to the traffic light 22). The beacon 13 can communicate with device 21 using BLE (Bluetooth Low Energy) technology also referred to as "Bluetooth Smart". The beacon 13 uses low energy proximity sensing to transmit a universally unique identifier picked up be a compatible "app" or operating system. The identifier can then be looked up over the Internet to determine the physical location of device 21 or trigger an action on device 21 such as a push notification or tracking and recording operations as discussed previously herein. One non-limiting example of a beacon device and systems that can be adapted for use as or with device 21 and beacon 13 and the methods/systems disclosed herein is discussed in U.S. Pat. No. 8,718,620 entitled "Personal Media Devices with Wireless Communication," which issued on May 6, 2014 and is incorporated herein by reference.

Based on the foregoing, it can be appreciated that a number of embodiments, preferred and alternative, are disclosed herein. For example, in one embodiment a method for alerting a vehicle driver via wireless communications can be implemented. Such a method can include the steps or logical operations of, for example, monitoring one or more conditions with respect to a vehicle; detecting a change in the condition (or conditions); transmitting a signal wirelessly to a computing device, the signal indicative of the change in the condition(s); and alerting the driver of the change in the condition(s) in response to transmitting the signal to the computing device. In some embodiments, the computing device may be, for example, a wireless hand held electronic device such as a smartphone or tablet computing device (e.g., iPad, Android tablet, etc.). In other embodiments, the table computing device may actually be integrated with the vehicle.

In some embodiments, the step or logical operation of alerting the driver of the change in the condition(s) further comprises providing an audible alert via a speaker associated with the computing device, the audible alert indicative of the change in condition(s). In another embodiment, the step or logical operation of alerting the driver of the change in the condition(s) can further include steps or logical operations for establishing a wireless connection between the computing device and a radio system of the vehicle; providing an audible alert from the computing device indicative of the change in the condition(s) via the radio system.

In yet another embodiment, the step or logical operation of alerting the driver of the change in the condition(s) can further include the step or logical operation of alerting the driver of the change in the condition by a text message displayable through the computing device. In still another embodiment, monitoring the condition(s) with respect to a vehicle can further involve monitoring such condition(s) with a camera. In some embodiments, such a camera may be for example, an HD video camera, a 360 degree video camera, etc.

In other embodiments, the step or logical operation of monitoring the condition(s) with respect to the vehicle can further include a step or logical operation of monitoring the condition(s) with one or more sensors (e.g., temperature sensor, tire pressure sensor, etc.). In yet other embodiments, the step or logical operation of monitoring the condition(s) can further involve a step or logical operation of analyzing video data from the 360 degree video camera utilizing anomaly detection. In still other embodiments, the step or logical operation of monitoring the condition(s) can further involve the step or logical operation of analyzing video data from the 360 degree video camera utilizing machine learning. In yet another embodiment the step or logical operation of monitoring the condition(s) can further include a step or logical operation of monitoring the condition(s) by analyzing video data from the 360 degree video camera utilizing location data (e.g., GPS data, beacon data, etc.) from a location module (e.g., GPS module, iBeacon, etc.) associated with, for example, the computing device or the vehicle itself (e.g., an in-vehicle mounted GPS unit).

In another embodiment, a method for alerting a vehicle driver via wireless communications, can be implemented. Such a method can include the steps or logical operations of monitoring one or more conditions external to a vehicle while the vehicle is in operation and a driver of the vehicle is located in a driver seat of the vehicle; detecting a change in the condition(s); transmitting a signal wirelessly to a computing device, the signal indicative of the change in the condition(s); and alerting the driver of the change in the condition(s) after transmission of the signal to the computing device.

In some embodiments, the step or logical operation of alerting the driver of the change in the condition(s) after transmission of the signal to the computing device, can further include a step or logical operation of providing an audible alert via a speaker associated with the computing device, the audible alert indicative of the change in the at least one condition. In still another embodiment, the step or logical operation of alerting the driver of the change in the condition(s) after transmission of the signal to the computing device, can further include the steps or logical operation of establishing a wireless connection between the computing device and a radio system of the vehicle; and providing an audible alert from the computing device indicative of the change in the condition(s) via the radio system. In some embodiments, the "vehicle in operation" can include at least one of: the vehicle in motion, or the vehicle temporarily stopped (i.e., yet still in operation, such as the vehicle temporarily stopped at an intersection).

In another embodiment, the step or logical operation of alerting the driver of the change in the at least one condition after transmission of the signal to the computing device, can further include the step or logical operation of providing an audible alert via a speaker associated with the computing device, the audible alert indicative of the change in the at least one condition. In another embodiment, the step of logical operation of alerting the driver of the change in the at least one condition after transmission of the signal to the computing device, can further include the steps or logical operations of establishing a wireless connection between the computing device and a radio system of the vehicle; and providing an audible alert from the computing device indicative of the change in the at least one condition via the radio system.

In still another embodiment, the step or logical operation of monitoring a condition external to a vehicle while the vehicle is in operation and a driver of the vehicle is located in a driver seat of the vehicle, can further include the step or logical operation of monitoring the at least one condition with a camera that communicates with the computing device. In some embodiments, the aforementioned camera may be integrated with the computing device or can be a standalone camera positioned within the vehicle to monitor the at least one condition and wherein the standalone camera communicates via a wireless connection with the computing device. In some cases more than one camera may be employed (e.g., both the standalone camera and the camera integrated with the computing device).

In another embodiments, steps or logical operations can be provided for tracking and recording in a memory of a computing system data indicative of a number of times the driver is alerted to the change in the at least one condition. Additionally, steps or logical operations may be provided for periodically retrieving the data from the memory; and transmitting the data wirelessly from the computing system to a central repository for further storage and analysis.

In some embodiments, the at least one condition external to the vehicle may be, for example, a stop light condition and the change in the at least one condition comprises a change from one stop light color to another stop light color.

In another embodiment the step or logical operation of transmitting the signal wirelessly to the computing device, the signal indicative of the change in the at least one condition, can further include or involve a step or logical operation of transmitting the signal wirelessly through a PAN (Personal Area Network). In some embodiments, such a PAN can be a network enabled for example, for: Bluetooth wireless communications, induction wireless communications, infrared wireless communications, ultra-wideband wireless communications and ZigBee wireless communications. In some embodiments, the wireless connection between the computing device and the radio system can be established via Secure Simple Pairing (SSP).

In other embodiments, the step or logical operation of detecting the change in the at least one condition can further involve a step or logical operation for utilizing an anomaly detection mechanism to detect the change in the at least one condition.

In another embodiment, steps or logical operations can be provided for determining if the vehicle is no longer in operation; monitoring at least one condition within the vehicle, in response to determining that the vehicle is no longer in operation; determining if the at least one condition within the vehicle comprises an anomalous condition; and wirelessly transmitting an alert to a computing device associated with the user, the alert indicative of the anomalous condition, if is determined that the at least one condition comprises the anomalous condition. In yet another embodiment the alert can be wirelessly transmitted as a text message to the computing device via a wireless network.

In another embodiment, a system for alerting a vehicle driver via wireless communications, can be implemented. Such a system can include, for example, a video camera (one or more video cameras), at least one processor that communicates with and processes video data captured by the video camera; and a computer-usable medium embodying computer program code, the computer-usable medium capable of communicating with the at least one processor. The computer program code can include instructions executable by the at least one processor and configured for example, for: monitoring at least one condition with respect to a vehicle with the video camera; detecting a change in the at least one condition monitored with the video camera; transmitting a signal wirelessly to a computing device, the signal indicative of the change in the at least one condition; and alerting the driver of the change in the at least one condition in response to transmitting the signal to the computing device. As indicated previously, the computing device may be, for example, a smartphone, a tablet computing device or an-vehicle computing system (or a combination of both).

In some embodiments, the aforementioned instructions for alerting the driver of the change in the at least one condition can be further configured for providing an audible alert via a speaker associated with the computing device, the audible alert indicative of the change in the at least one condition. In some situations, the speaker may be, for example, a speaker integrated with a smartphone, tablet computing device, etc. The speaker may also be an audio speaker associated with an in-vehicle system such as discussed herein.

In other embodiments, the aforementioned instructions for alerting the driver of the change in the at least one condition can be further configured for establishing a wireless connection between the computing device and a radio system of the vehicle; and providing an audible alert from the computing device indicative of the change in the at least one condition via the radio system.

In yet another embodiment, the instructions for alerting the driver of the change in the at least one condition can further include instructions configured for alerting the driver of the change in the condition by a text message displayable through the computing device.

In some embodiments, such a camera may be a 360 degree video camera. In other embodiments, one or more sensors can also be employed for use in monitoring the condition(s). In another embodiment, the instructions for monitoring the at least one condition can include instructions for analyzing the video data captured from the 360 degree video camera utilizing anomaly detection. In yet another embodiment, the instructions for monitoring the at least one condition can further include instructions for analyzing the video data captured from the 360 degree video camera utilizing machine learning. In still another embodiment, the instructions for monitoring the at least one condition can further involve or include instructions for analyzing the video data captured from the 360 degree video camera utilizing location data from a location (e.g., GPS module, beacon, etc.) associated with the computing device.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entire hardware embodiment, an entire software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Some embodiments may be implemented in the context of a so-called "app" or software application. An "app" is a self-contained program or piece of software designed to fulfill a particular purpose; an application, especially as downloaded by a user to a mobile device (e.g., smartphone, tablet computing device, etc.).

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

What is claimed is:

1. A system for alerting a vehicle driver via wireless communications, said system comprising:
   at least one processor; and
   a non-transitory computer-usable medium embodying computer program code, said computer-usable medium capable of communicating with said at least one processor, said computer program code comprising instructions executable by said at least one processor and configured for:
      monitoring at least one condition external to a vehicle while said vehicle is in operation and a driver of said vehicle is located in a driver seat of said vehicle and said vehicle is stopped;
      detecting a change in said at least one condition external to said vehicle during said monitoring of said at least one condition while said vehicle is stopped;
      transmitting a signal wirelessly to a computing device, said signal indicative of said change in said at least one condition external to said vehicle; and
      alerting said driver of said change in said at least one condition external to said vehicle after transmission of said signal to said computing device.

2. The system of claim 1 wherein said instructions for alerting said driver of said change in said at least one condition external to said vehicle after transmission of said signal to said computing device, further comprises instructions configure for:
   providing an audible alert via a speaker associated with said computing device, said audible alert indicative of said change in said at least one condition external to said vehicle.

3. The system of claim 1 wherein said instructions for alerting said driver of said change in said at least one condition external to said vehicle after transmission of said signal to said computing device, further comprises instructions configured for:
   establishing a wireless connection between said computing device and a radio system of said vehicle;
   providing an audible alert from said computing device indicative of said change in said at least one condition external to said vehicle, wherein said audible alert is broadcast via said radio system, after said establishing said wireless connection between said computing device and said radio system of said vehicle.

4. The system of claim 1 wherein said at least one condition comprises at least one condition of a traffic light and said change in said at least one condition external to said vehicle comprises a change in said at least one condition of said traffic light.

5. The system of claim 1 wherein said computing device comprises at least one of a smartphone and a tablet computing device.

6. The system of claim 1 wherein said at least one condition external to said vehicle comprises a stop light condition and said change in said at least one condition comprises a change from one stop light color to another stop light color.

7. The system of claim 1 wherein instructions for alerting said driver of said change in said at least one condition after transmission of said signal to said computing device, further comprises instructions configured for:
   establishing a wireless connection between said computing device and a radio system of said vehicle;
   providing an audible alert from said computing device indicative of said change in said at least one condition via said radio system.

8. The system of claim 1 wherein said instructions for monitoring a condition external to a vehicle while said vehicle is in operation and a driver of said vehicle is located in a driver seat of said vehicle, further comprises instructions configured for:
   monitoring said at least one condition with a camera that communicates with said computing device.

9. The system of claim 1 wherein said instructions are further configured for:
   tracking and recording in a memory of a computing system data indicative of a number of times said driver is alerted to said change in said at least one condition external to said vehicle while said vehicle is stopped.

10. The system of claim 9 wherein said instructions are further configured for:
    periodically retrieving said data from said memory; and
    transmitting said data wirelessly from said computing system to a central repository for further storage and analysis.

11. A method for alerting a vehicle driver via wireless communications, said method comprising:
    monitoring at least one condition with respect to a vehicle with said video camera while said vehicle is stopped;
    detecting a change in said at least one condition during said monitoring of said at least one condition with a video camera wherein said change in said at least one condition is detected by said video camera while said vehicle is stopped;
    transmitting a signal wirelessly to a computing device, said signal indicative of said change in said at least one condition detected by said video camera; and
    alerting said driver of said change in said at least one condition in response to transmitting said signal to said computing device, wherein said alerting said driver of said change in said at least one condition, further comprises establishing a wireless connection between said computing device and a radio system of said vehicle and providing an audible alert from said computing device indicative of said change in said at least one condition via said radio system; and
    wherein said wireless connection comprises a PAN (Personal Area Network) and wherein said instructions for alerting said driver of said change in said at least one condition further comprise instructions configured for alerting said driver of said change in said at least one condition by a text message displayable through said computing device and simultaneously broadcast as a voice alert through said computing device and said radio system, said voice alert including said audible alert.

12. The method of claim 11 wherein said computing device comprises at least one of a smartphone and a tablet computing device.

13. The method of claim 11 wherein said instructions for alerting said driver of said change in said at least one condition are further configured for providing an audible alert via a speaker associated with said computing device, said audible alert indicative of said change in said at least one condition while said vehicle is stopped.

14. The method of claim 11 wherein said video camera comprises a 360 degree video camera and wherein said at least one condition is monitored by automatically analyzing video data obtained from said 360 degree video camera utilizing anomaly detection in association with machine learning and GPS data obtained from said system.

15. The system of clam 1 wherein said at least one condition external to said vehicle comprises a pedestrian and said change in said at least one condition external to said vehicle comprises a movement of said pedestrian.

16. The system of claim 1 wherein said signal is transmitted wirelessly to said computing device through a bidirectional wireless communications network.

17. The system of claim 1 wherein said at least one condition external to said vehicle is monitored by at least one sensor and at least one video camera.

18. The system of claim 8 wherein said camera comprises a wireless video camera.

19. The system of claim 1 wherein said computing device comprises an in-vehicle system that provides an alert indicative of said change in said at least one condition external to said vehicle after said transmission of said signal to said computing device, said in-vehicle system associated with said vehicle.

20. The system of claim 1 wherein said monitoring said at least one condition external to said vehicle, further comprises determining how far said at least one condition is from said vehicle.

* * * * *